United States Patent
Vilaetis et al.

(10) Patent No.: US 10,144,403 B2
(45) Date of Patent: Dec. 4, 2018

(54) ELECTRONIC CONFIGURABLE EQUALIZING RESERVOIR BACKUP SYSTEM

(71) Applicant: New York Air Brake, LLC, Watertown, NY (US)

(72) Inventors: Konstantinos Vilaetis, Watertown, NY (US); Erich Leonard, Clayton, NY (US)

(73) Assignee: New York Air Brake, LLC, Watertown, NY (US)

( * ) Notice: Subject to any disclaimer, the term of this patent is extended or adjusted under 35 U.S.C. 154(b) by 70 days.

(21) Appl. No.: 15/090,753

(22) Filed: Apr. 5, 2016

(65) Prior Publication Data

US 2017/0282886 A1 Oct. 5, 2017

(51) Int. Cl.
*B60T 17/22* (2006.01)
*B60T 11/26* (2006.01)
*B60T 13/66* (2006.01)

(52) U.S. Cl.
CPC .............. *B60T 17/221* (2013.01); *B60T 11/26* (2013.01); *B60T 13/662* (2013.01); *B60T 13/665* (2013.01); *B60T 2270/402* (2013.01)

(58) Field of Classification Search
CPC ................................ B60T 17/221; B60T 11/26
See application file for complete search history.

(56) References Cited

U.S. PATENT DOCUMENTS

| 5,718,487 | A | * | 2/1998 | Roselli | B60T 13/665 303/132 |
|---|---|---|---|---|---|
| 5,721,683 | A | * | 2/1998 | Joyce, Jr. | B60T 13/665 303/25 |
| 6,024,419 | A | * | 2/2000 | Waldrop | B60T 13/665 303/15 |
| 6,042,201 | A | * | 3/2000 | Marra | B60T 7/128 303/128 |
| 6,318,813 | B1 | * | 11/2001 | Goodell | B60T 13/26 280/124.157 |

(Continued)

OTHER PUBLICATIONS

International Search Report Form PCT/ISA/220, International Application No. PCT/US2016/025982, pp. 1-10, dated Dec. 22, 2016.

*Primary Examiner* — Jess Whittington
(74) *Attorney, Agent, or Firm* — Bond Schoeneck and King PLLC; David Nocilly

(57) ABSTRACT

An equalizing reservoir backup system that offers air brake control to the operator when the air brake network has failed or when the computer control equipment of the air brake system has failed. The system includes an equalizing reservoir backup module that is programmed to receive the electrical signals from human machine interface and configuration messages from the computer controlled braking system via the network and to control the train brake pipe via equalizing reservoir control. The equalizing reservoir backup module follows network pressure commands when commanded to do so or transforms handle commands into equalizing pressure when commanded to do so or when communications with the network have been lost. As a result, the backup system can be used when the network has failed or when the computer equipment has failed.

12 Claims, 3 Drawing Sheets

(56) References Cited

U.S. PATENT DOCUMENTS

| | | | |
|---|---|---|---|
| 6,375,275 B1* | 4/2002 | Smith, Jr. | B60T 13/665 303/15 |
| 9,321,468 B2* | 4/2016 | Leonard | B61H 13/02 |
| 2002/0153766 A1* | 10/2002 | Kettle, Jr. | B60T 13/665 303/15 |
| 2007/0063581 A1* | 3/2007 | Teifke | B60T 13/665 303/119.3 |
| 2015/0353061 A1* | 12/2015 | Leonard | B60T 13/665 701/19 |
| 2017/0096154 A1* | 4/2017 | Hurst | B61L 25/025 |

* cited by examiner

ELECTRONIC CONFIGURABLE EQUALIZING RESERVOIR BACKUP SYSTEM

BACKGROUND OF THE INVENTION

1. Field of the Invention

The present invention relates to train braking systems and, more particularly, to a backup system for providing brake pipe control in the event of a communication network or computer equipment failure.

2. Description of the Related Art

In the event that a locomotive has a failed air brake system, the locomotive operator must close the main line have the locomotive towed. This process is costly and adversely impacts the schedules for all equipment traveling on the main line. As a result, backup systems may be employed that allow a locomotive with a failed air brake system, whether pneumatic, electro-pneumatic or computer controlled, to be moved under its own power. For example, a locomotive with a computer controlled brake system may have a computer controlled backup system that relies on a computer controlled human machine interface (HMI) and existing locomotive network communications. A failure of either of those subsystems, however, prevents the use of the backup system. A locomotive with electro-pneumatic or fully pneumatic braking system (with or without a main computer controlled system) may have an electro-pneumatic, or pneumatic backup system. Existing electro-pneumatic or pneumatic backup systems, however, generally require additional hardware that is expensive, difficult to install, unreliable, and provides very limited functionality. Accordingly, there is a need in the art for a backup system for a locomotive air brake system that addresses one or more of these shortcomings in existing backup systems.

BRIEF SUMMARY OF THE INVENTION

The present invention is a locomotive air brake backup system that has an equalizing reservoir backup module that is configured to receive a signal representing movement of a brake handle from a human machine interface. The backup module is further configured to receive a configuration message from a brake system controller. The backup module is programmed to transform the signal representing movement of the brake handle from the human machine interface into a predetermined equalizing reservoir target pressure and provide the equalizing reservoir pressure to the pneumatic relay associated with the brake pipe. The configuration message establishes how the equalizing reservoir backup module is to transform the signal representing movement of the brake handle into the predetermined equalizing reservoir pressure. The equalizing reservoir backup module is programmed to require receipt of the configuration message prior to performing any transform of the signal representing movement of the automatic brake handle into the predetermined equalizing reservoir pressure. The equalizing reservoir backup module can include a multichannel sensor for receiving the signal from the human machine interface and have an isolated power source.

The equalizing reservoir backup module may be configured to transform the signal representing movement of the brake handle into the predetermined equalizing reservoir target pressure and rate of the brake system in response to a command received from a communication network of a locomotive. The equalizing reservoir backup module may also be configured to transform the signal representing movement of the brake handle into the predetermined equalizing reservoir target pressure and rate if a communication network of the brake system is not operational. The equalizing reservoir backup module regularly performs a diagnostic test that determines whether the backup module can transform the signal representing movement of the brake handle into the predetermined equalizing reservoir target pressure and rate. The equalizing reservoir backup module may further be configured to receive a second signal representing movement of a brake handle from a second human machine interface for use in a dual cab system.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
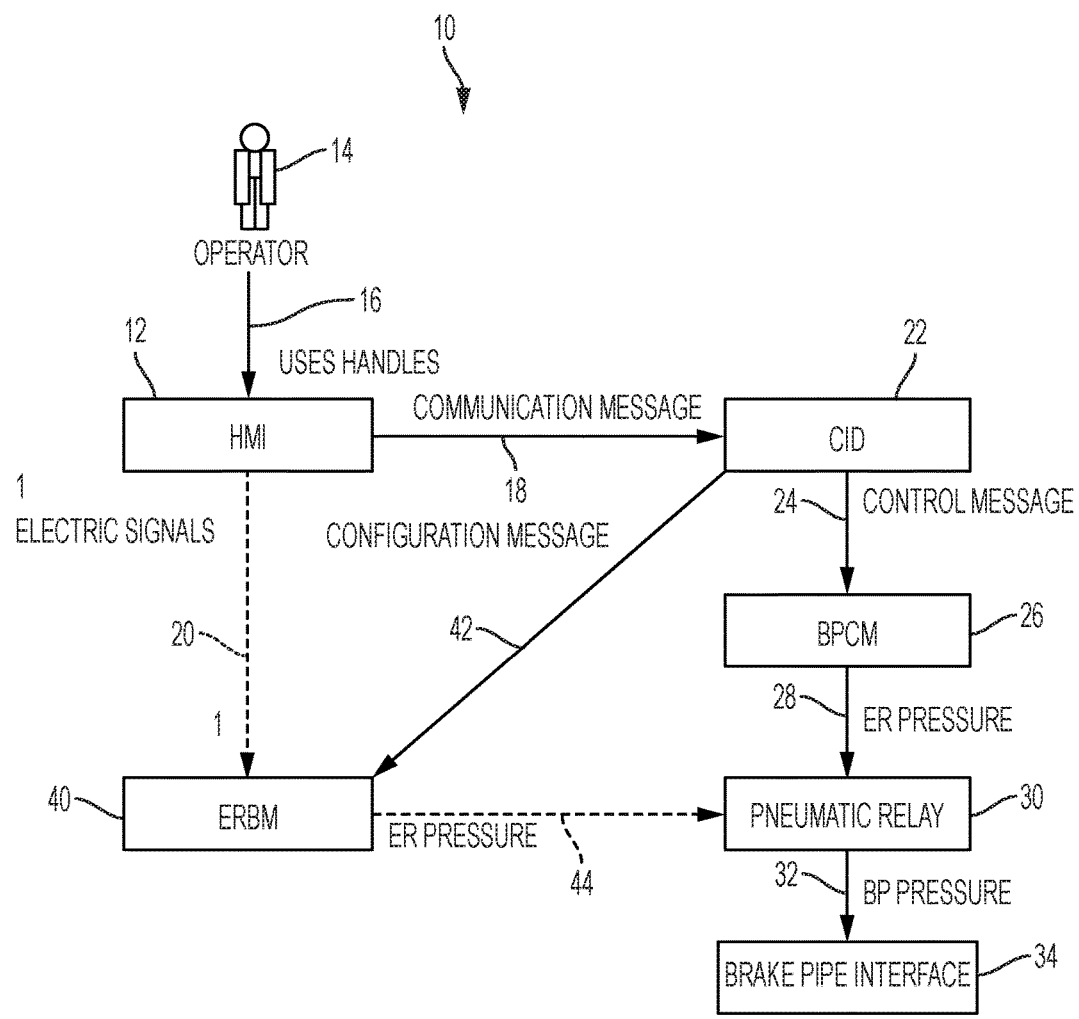
FIG. 1 is a schematic of an equalizing reservoir backup system according to the present invention.

Referring to the Figures, wherein like numerals refer to like parts throughout, there is seen in FIG. 1 an equalizing reservoir backup system (ERBS) 10 for use in computer controlled brake system. ERBS 10 includes an HMI 12 that allows an operator 14 to provide instructions on train operation, such as by using handles 16 associated with HMI 12. HMI 12 sends handle related information to the network. For example, HMI 12 generates a communication message 18 corresponding to the interaction of the user with HMI 12. HMI 12 is further configured to send electric signals 20 representing handle movements made by operator 14.

ERBS 10 also includes a central intelligence device (CID) 22 that is programmed to translate the communication message 18 received from HMI 12 into a control message 24. Control message 24 signifies the appropriate change in pressure of the equalizing reservoir (ER) of the braking system that corresponds to the movements of user handles 16 input into HMI 12. CID 22 may be provided as a stand-alone module, or be incorporated as specific programming in another component that is programmable, such as HMI 12.

ERBS 10 further includes a brake pipe control module (BPCM) 26 that is programmed to control the ER to generate the appropriate ER pressure 28 in response to control messages 24 received from CID 22. BPCM 26 thus provides all brake pipe (BP) related functionality associated with pneumatic train braking systems and is the main ER controller. ERBS 10 additionally includes a pneumatic relay 30 that relays ER pressure established by BPCM 26 into the appropriate BP pressure 32 via a brake pipe interface 34 to control the train brakes.

ERBS further includes an equalizing reservoir backup module (ERBM) 40 coupled to HMI 12 and CID 22. ERBM 40 is programmed to receive the analog electrical signals from HMI 12 (voltage or current) that represent brake handle movements as well as a configuration message 42 from CID 22. ERBM 40 is further programmed to transform the analog signals representing brake handle movements into the appropriate ER change, and thus BP change, that corresponds to the brake handle movements. The brake handle movement to ER pressure transformation includes pressure targets and discrete events, such as overcharge, assimilation, and emergency. ERBM 40 can thus perform electronic ER target and rate control, as well as electronic overcharge and assimilation, thereby reducing component count and increasing reliability over conventional approaches. ERBM 40 may be configured via default setting options or remote configuration to provide brake handle movement to ER pressure transformations that are in compliance with applicable governmental or industry regulations, such as International Union of Railways (UIC), Association of American Railroads (AAR), and State Union Standards (GOST).

ERBM 40 may be integrated into ERBS 10 in two manners. First, ERBM 40 can utilize the same automatic brake handle of the HMI 12 via a multichannel sensor with isolated power or via a separate sensor. Second, ERBM 40 can utilize a secondary backup brake handle of HMI 12 that provides an analog electrical signal to ERBM 40. In this option, the secondary backup brake handle of the HMI 12 is physically separate from the main automatic brake handle.

ERBM 40 receives configuration message 42 from CID 22 so that ERBM 40 can produce the correct transformation of handle movement to ER without any hardware variation. ERBM 40 thus requires configuration message 42 to be established at some point in time, either during installation or in real-time such as during an airbrake operation. Real-time configuration messages 42 allow ERBM to make adjustments such as release pressure or mode-specific behavior. In response to electrical signals 20 from HMI 12 and an appropriate configuration message 42, ERBM 40 can provide the appropriate ER pressure 44 directly to pneumatic relay 30. ERBM 40 can control ER pressure based on network commands directly or via EBV analog commands directly.

ERBM 40 requires explicit activation via HMI 12 in order to allow safe ER control. The activation can be initiated via configuration message 42 received from CID 22. The activation is required when ERBM 40 switches over to control the ER, and when the active HMI for dual cabs is switched. In most cases, the activation requires a new release command from HMI 12, thereby ensuring that the operator has explicitly requested a brake release.

ERBM 40 can be configured to include multiple HMIs 12 via a separate analog electric signal provided by each HMI 12. This arrangement allows ERBM 40 to support dual cab applications without the need for complex activation procedures. ERBM 40 thus may also be configured to include multiple discrete cab active electrical signals. ERBM 40 may further be configured to include a primary HMI 12a and a secondary, backup HMI 12b to support operational requirements. When the primary HMI 12a is in use, the analog electrical signals may be isolated from the computer (separate power and signals). ERBM 40 can be configured to take over in response to commands received via a network, or by default in response to a network communication loss. ERBM 40 may be programmed to perform electronic ER target and rate control as well as electronic overcharge and assimilation, thereby reducing component count and increasing reliability. ERBM 40 may also be programmed to monitor its availability by performing diagnostics during normal system operation. This self-monitoring ensures that a failure in ERBM 40 will be detected prior to an operator requesting back-up service. This self-monitoring also minimizes the need for manual diagnostics required by some current backup systems.

ERBS 10 may thus be used to provide backup for a computer control failure in HMI 12. ERBS 10 can use isolated analog electrical signals to command ER based on the last known configuration. ERBS 10 can also provide backup in the event of a network failure by using analog electrical signals to command ER based on last known configuration. ERBS 10 can further provide for backup in the event of the failure of CID 22 by using analog electrical signals to command ER based on last known configuration. Finally, ERBS 10 can provide backup in the event of a failure of BPCM 26 by using analog electrical signals to command ER based on last known configuration.

Figure 2:
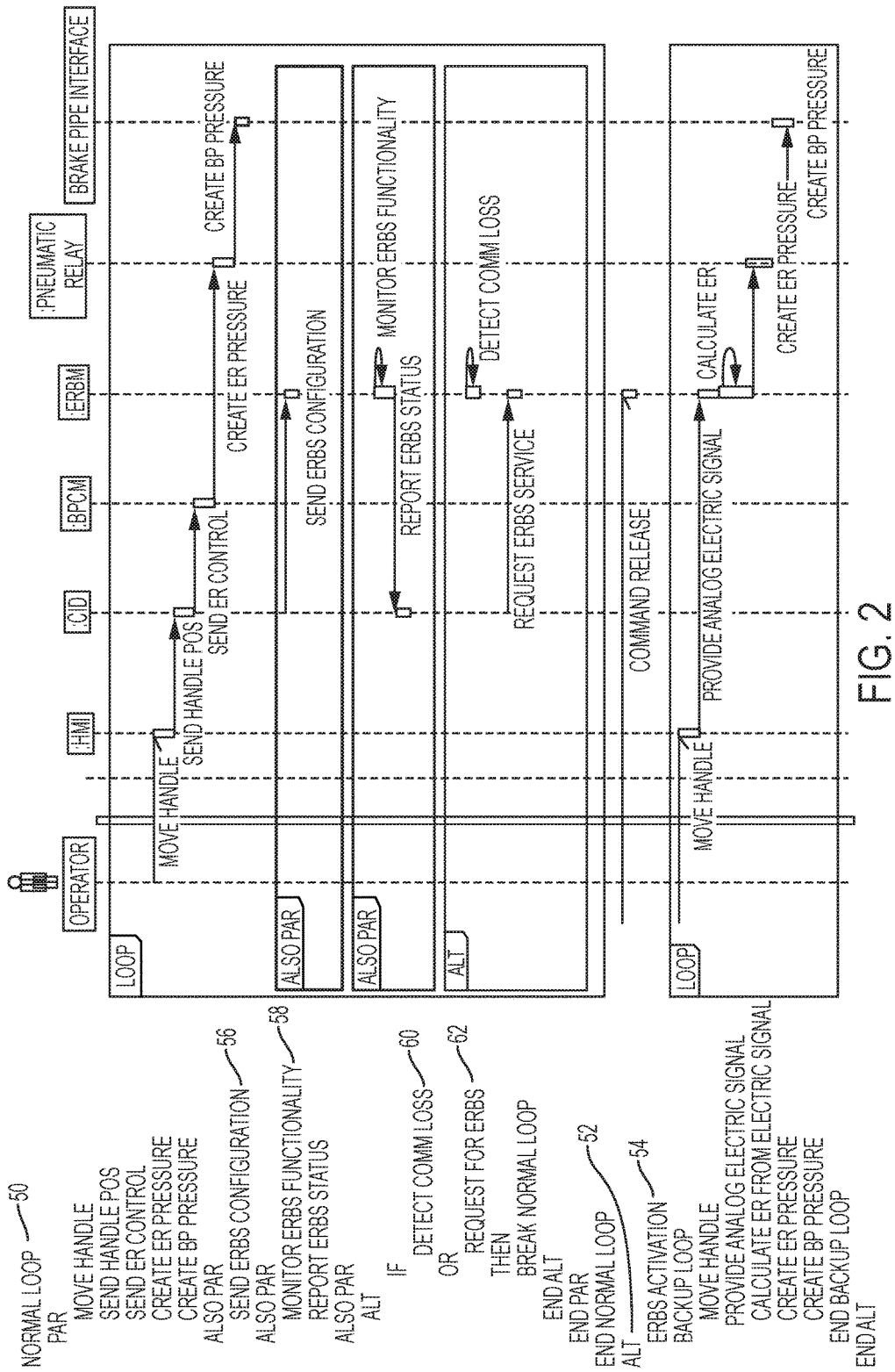
FIG. 2 is a sequence diagram for an equalizing reservoir backup system according to the present invention.

There is seen in FIG. 2, a sequence of operation for providing ER control using ERBS 10. More specifically, a normal loop 50 providing conventional brake control and a backup loop 52 where ERBS 10 controls the brakes are selectively implemented in response to ERBS activation 54. As further seen in FIG. 2, ERBS 10 configuration 56 and monitoring of ERBS functionality 58 is performed occur during normal loop 50. If a communication loss is detected 60, or a result for back-up is received, normal loop 62 is exited and backup loop_commences.

Figure 3:
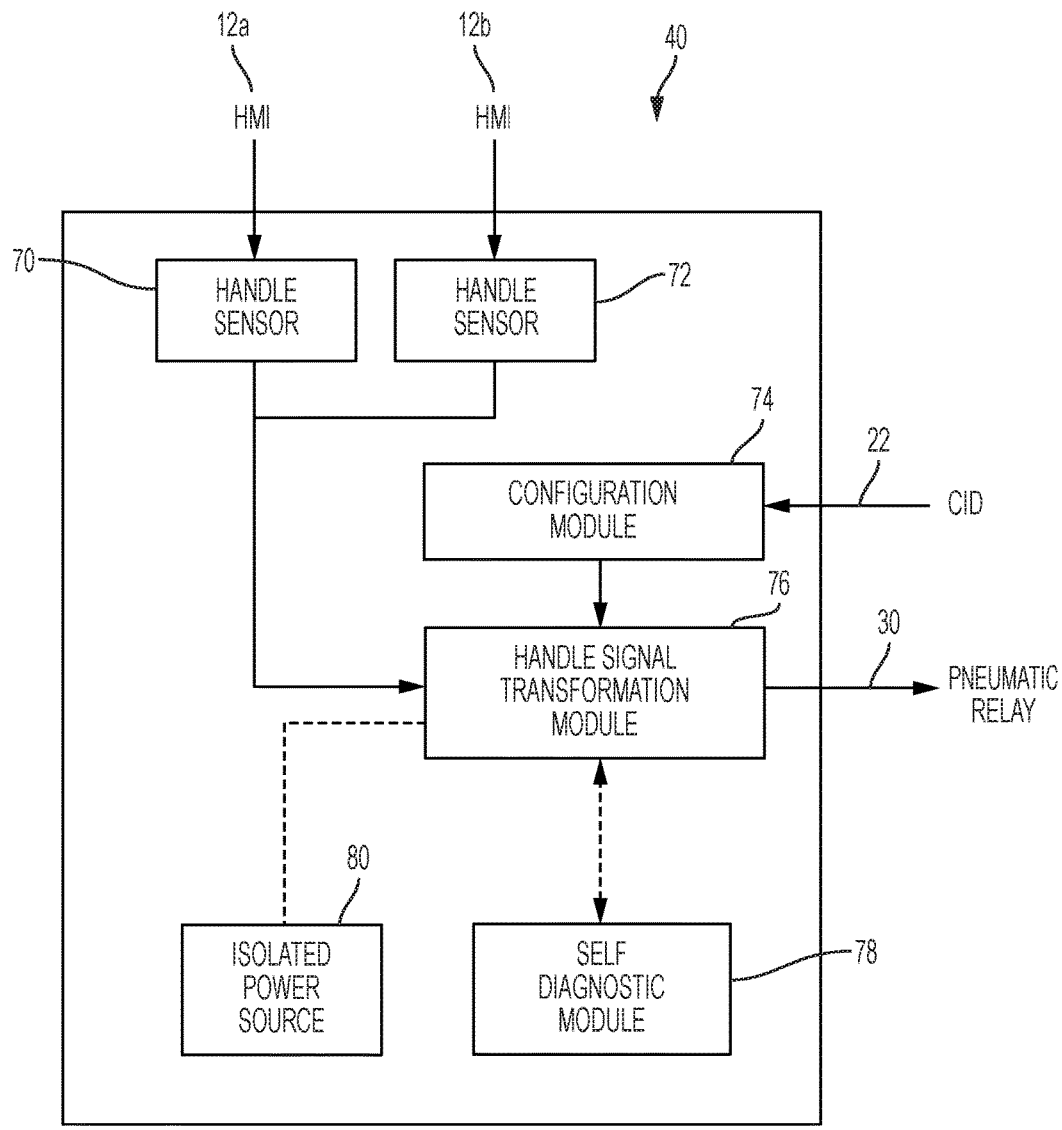
FIG. 3 is a schematic of an equalizing reservoir backup module for a equalizing reservoir backup system according to the present invention.

Referring to FIG. 3, ERBM 40 may be include first and second handle sensors 70 and 72 for receiving signals from primary HMI 12a and, optionally, second HMI 12b and transmitting analog signals representing handle positions. A configuration device 74 is in communication with CID 22 for receiving configuration messages 42. Configuration device 74 establishes the appropriate handle movement transformation into ER pressure via a handle signal transformation module 76. As discussed above, configuration device 74 can be programmed with an appropriate library of handle signal to equalizing reservoir transformation, with the appropriate transformation established in advance or prior to use or in real-time. Such transformations can map specific handle zones to ER behavior. For example, a handle position can be mapped to an overcharge and assimilation trigger, or a handle zone can be mapped to a linear transformation between two ER target pressure values. In addition, different ER rates can be mapped to different handle zones as well. For example, a handle zone or position can be mapped to emergency application, which would result in an ER target pressure of zero, at a defined higher rate than at other zones. As an example, configuration messages for instances where the HMI electric signal is a 4 to 20 mA signal could be as seen in Table 1 below:

TABLE 1

| Handle Position | Mapped Function |
| --- | --- |
| 5 mA or less | overcharge and assimilation SW function |
| 5 to 12 mA | linear interpolation of target pressure ER of 90 psi to 64 psi, with a rate of 7 psi/sec |
| 12 to 13 mA | target pressure ER of 64 psi with a rate of 7 psi/sec |
| 13-18 mA | linear interpolation of target pressure ER of 64 psi to 30 psi, with a rate of 7 psi/sec |
| 18+ mA | emergency and is an ER target of 0 psi with a rate of 25 psi/sec. |

Configuration device 74 can also be programmed to address electronic ER target and rate control, as well as electronic overcharge and assimilation. Handle signal transformation module 76 transforms, via software, the handle signals received from primary HMI 12*a* or second HMI 12*b* by sensors 70 and/or 72, and then provides an appropriate ER target pressure and rate to pneumatic relay 30 of the locomotive braking system. The pneumatic brake pipe relay uses the ER pressure signal to control the train brake pipe pressure in a similar manner to that by which the pneumatic relay functions during normal operations. As discussed above, a self-diagnostic module 78 may be included to perform self-tests to ensure that ERBM 40 is ready to provide backup when commanded or if there is a loss of network communications. In addition, ERBM 40 may also include an isolated power source 80.

ERBS 10 thus offers automatic air brake control to the operator even when the air brake network has failed or when the central intelligence device of the air brake has failed. ERBS 10 can be used in a system where the EBV signals or the air brake network are available. ERBS 10 follows network pressure commands when commanded to do so or direct handle commands when commanded to do so or if communications have been lost.

As described above, system 10 may be implemented a system, a method, and/or a computer program product and is described herein with reference to flowcharts and block diagrams of methods and apparatus. The flowchart and block diagrams illustrate the architecture, functionality, and operation of possible implementations of systems, methods, and computer program products of the present invention. It should be understood that each block of the flowcharts and block diagrams can be implemented by computer readable program instructions in software, firmware, or dedicated analog or digital circuits. The computer readable program instructions may be implemented on the processor of a general purpose computer, a special purpose computer, or other programmable data processing apparatus to produce a machine that implements a part of (or all of) one of more of the blocks illustrated in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A locomotive air brake backup system, comprising:
a human machine interface configured to send a communication message representing operator instructions over a locomotive communication network to a brake system controller that is programmed to translate the communication message into a control message signifying a first equalizing reservoir pressure based on the communication message and to send the control message over the locomotive communication network to a brake pipe control module that controls a pneumatic relay coupled to a locomotive brake pipe according to the equalizing reservoir pressure;
an equalizing reservoir backup module configured to receive an analog signal from the human machine interface that is different than the communication message and that represents movement of a brake handle to transform the signal received from the human machine interface into a second equalizing reservoir pressure, and to provide the second equalizing reservoir pressure directly to the pneumatic relay that is coupled to the locomotive brake pipe.

2. The system of claim 1, wherein the equalizing reservoir backup module is configured to receive a configuration message that establishes how the equalizing reservoir backup module is to transform the signal representing movement of the brake handle into the predetermined equalizing reservoir pressure.

3. The system of claim 2, wherein the equalizing reservoir backup module is programmed to require receipt of the configuration message prior to performing any transform of the signal representing movement of the brake handle into the predetermined equalizing reservoir pressure.

4. The system of claim 3, wherein the equalizing reservoir backup module is configured to transform the signal representing movement of the brake handle into the predetermined equalizing reservoir pressure in response to a command received from a communication network of a brake system.

5. The system of claim 3, wherein the equalizing reservoir backup module is configured to transform the signal representing movement of the brake handle into the predetermined equalizing reservoir pressure if a communication network of the brake system is not operational.

6. The system of claim 5, wherein the equalizing reservoir backup module is configured to regularly perform a diagnostic test that determines whether the equalizing reservoir backup module can transform the signal representing movement of the brake handle into the predetermined equalizing reservoir pressure.

7. The system of claim 6, wherein the equalizing reservoir backup module is configured to receive a second signal representing movement of a brake handle from a second human machine interface.

8. The system of claim 7, wherein the equalizing reservoir backup module includes a multichannel sensor for receiving the signal from the human machine interface.

9. The system of claim 8, wherein the equalizing reservoir backup module includes its own power source.

10. The system of claim 8, wherein the equalizing reservoir backup module is configured to provide overcharge and assimilation functions in response to the signal representing movement of the brake handle from the human machine interface.

11. A method of operating a locomotive air brake backup system, comprising the steps of:
providing a human machine interface configured to send a communication message representing operator instructions over a locomotive communication network to a brake system controller that is programmed to translate the communication message into a control message signifying a first equalizing reservoir pressure based on the communication message and to send the control message to a brake pipe control module that controls a pneumatic relay coupled to a locomotive brake pipe according to the equalizing reservoir pressure;
providing an equalizing reservoir backup module that is coupled to the human machine interface and is configured to receive an analog signal representing movement of a brake handle from the human machine interface that is different than the communication message and to receive a configuration message from the brake system controller;
receiving the configuration message, wherein the configuration message establishes how the equalizing reservoir backup module is to transform the signal representing movement of the brake handle into a second equalizing reservoir pressure;

receiving the signal representing movement of the brake handle from the human machine interface;

transforming the signal representing movement of the brake handle from the human machine interface into the second equalizing reservoir pressure according to the configuration message establishing how the equalizing reservoir backup module is to transform the signal representing movement of the brake handle into the second equalizing reservoir pressure; and providing the second equalizing reservoir pressure to a pneumatic relay that is coupled to a locomotive brake pipe.

12. The method of claim 11, wherein the equalizing reservoir backup module is configured to transform the signal representing movement of the brake handle into the predetermined equalizing reservoir pressure in response to a command received from a communication network of a brake system or if a communication network of the brake system is not operational.

* * * * *